US008032520B2

(12) United States Patent
Dipper et al.

(10) Patent No.: US 8,032,520 B2
(45) Date of Patent: Oct. 4, 2011

(54) EXTENDED HANDLING OF AMBIGUOUS JOINS

(75) Inventors: Stefan Dipper, Wiesloch (DE); Christel Rueger, Hanau (DE); Stefan Biedenstein, Bad Schoenborn (DE)

(73) Assignee: SAP AG, Walldorf (DE)

( * ) Notice: Subject to any disclaimer, the term of this patent is extended or adjusted under 35 U.S.C. 154(b) by 381 days.

(21) Appl. No.: 11/867,627

(22) Filed: Oct. 4, 2007

(65) Prior Publication Data
US 2009/0094215 A1  Apr. 9, 2009

(51) Int. Cl.
*G06F 17/30* (2006.01)
(52) U.S. Cl. ........................................................ 707/714
(58) Field of Classification Search .................. 707/2, 3, 707/4, 6, 100, 705, 713, 714, 999.002, 715, 707/718, 719, 729, 721
See application file for complete search history.

(56) References Cited

U.S. PATENT DOCUMENTS

| | | | | |
|---|---|---|---|---|
| 4,497,039 | A * | 1/1985 | Kitakami et al. ........................ | 1/1 |
| 6,640,221 | B1 * | 10/2003 | Levine et al. ........................ | 707/3 |
| 7,519,606 | B2 * | 4/2009 | Hernandez-Sherrington et al. ......... | 707/100 |
| 2003/0217048 | A1 * | 11/2003 | Potter et al. ........................ | 707/3 |
| 2004/0122844 | A1 * | 6/2004 | Malloy et al. .................. | 707/102 |
| 2007/0282789 | A1 * | 12/2007 | Deshpande et al. .............. | 707/2 |
| 2008/0033907 | A1 * | 2/2008 | Woehler et al. ................... | 707/2 |

FOREIGN PATENT DOCUMENTS
EP   1134671 A1 *  9/2001

OTHER PUBLICATIONS

Kung et al., Vague Joins—An Extension of the Vague Query System VQS, Database and Expert Systems Applications, 1998. Proceedings. Ninth International Workshop on, Aug. 26-28, 1998, pp. 997-1001.*
Lee et al., Adaptive Selection of Access Path and Join Method, Computer Software and Applications Conference. 1989. COMPSAC 89. Proceedings of the 13th Annual International , Sep. 20-22, 1989, pp. 250-256.*

* cited by examiner

*Primary Examiner* — Greta Robinson
(74) *Attorney, Agent, or Firm* — Mintz, Levin, Cohn, Ferris, Glovsky and Popeo, P.C.

(57) ABSTRACT

A system, method and article for handling ambiguous joins among a plurality of tables based on a query are disclosed. Metadata associated with the plurality tables is generated. The metadata comprises ambiguous join dimensions and special measures, where the ambiguous join dimensions provide a list of all dimensions used in conditions of the query that are ambiguous, and the special measures provide a list of measures that are affected by the ambiguous join dimensions. Data is aggregated in the plurality of tables according to an aggregation level expressed in the query and based on the metadata.

20 Claims, 9 Drawing Sheets

| #CUSTOMER | #MATERIAL1 | #COUNTRY | QUANTITY1 | PRICE |
|---|---|---|---|---|
| Miller | 00001 | US | 5 | 500 |
| Miller | 00001 | DE | 1 | 100 |
| Henry | 00002 | US | 3 | 150 |
| Henry | 00001 | DE | 6 | 600 |
| Jenkins | 00003 | DE | 2 | 100 |

Sales Table

| #MATERIAL2 | QUANTITY2 |
|---|---|
| 00001 | 11 |
| 00002 | 30 |
| 00003 | 5 |

Store table

| #CUSTOMER | #MATERIAL1 | #MATERIAL2 | QUANTITY2 |
|---|---|---|---|
| Miller | 00001 | 00001 | 11 |
| Henry | 00006 | - | - |
| Jenkins | 00008 | - | - |

FIG. 1(C)

| #CUSTOMER | #MATERIAL1 | #MATERIAL2 | QUANTITY2 |
|---|---|---|---|
| Miller | 00001 | 00001 | 11 |
| - | | 00006 | 12 |
| - | | 00008 | 07 |

| Examined Table | Join | Table causing Ambiguity | Comment |
|---|---|---|---|
| Table A | Table A -> Table B | | not ambiguous |
| | Table A -> Table C | C | C.2 not in join cond. |
| | Table C -> Table D | D | D causes ambiguity due to C |
| Table B | Table B -> Table A | A | A.2 not in join cond. |
| | Table A -> Table C | C | C causes ambiguity due to A |
| | Table C -> Table D | D | D causes ambiguity due to C |
| Table C | Table C -> Table A | A | A.1 and A.2 not in join cond. |
| | Table A -> Table B | B | B causes ambiguity due to A |
| | Table C -> Table D | | Not ambiguous |
| Table D | Table D -> Table C | | Not ambiguous |
| | Table C -> Table A | A | A.1 and A.2 not in join cond. |
| | Table A -> Table B | B | B causes ambiguity due to A |

FIG. 4

| Join | Dimensions in join conditions |
| --- | --- |
| Table A -> Table C | A.3, C.1 |
| Table B -> Table A | B.1, A.1 |
| Table C -> Table A | A.3, C.1 (identical to A-> C) |

FIG. 5A

| Examined Table | Tables causing Ambiguity | Measures of examined table | Dimensions of tables causing Ambiguity |
| --- | --- | --- | --- |
| A | C, D | A.4, A.5 | ~~C.1~~, C.2, D.1, D.2 |
| B | A,C,D | B.2 | ~~A.1~~, A.2, A.3, C.1, C.2, D.1, D.2 |
| C | A,B | C.3 | A.1, A.2, ~~A.3~~, B.1 |
| D | A,B | D.3 | A.1, A.2, ~~A.3~~, B.1 |

FIG. 5B

| Country | Quantity2 (Items in stock) |
|---|---|
| DE | 35 |
| US | 41 |
| Total | 46 |

FIG. 6A

| Country | Material1 (= Material2) | Quantity2 (Items in stock) |
|---|---|---|
| DE | 0001 | 30 |
|  | 0003 | 5 |
|  | Total | 35 |
| US | 0001 | 30 (not counted twice) |
|  | 0002 | 11 |
|  | Total | 41 |
| Total |  | 46 |

FIG. 6B

| Customer | Country | Material1 (= Material2) | Quantity1 (Sold Items) | Quantity2 (Items in stock) |
|---|---|---|---|---|
| Miller | DE | 0001 | 1 | 11 |
|  | US | 0001 | 5 | 11 |
|  | Total | 0001 | 6 | 11 |
| Henry | DE | 0001 | 6 | 11 |
|  | US | 0002 | 3 | 30 |
|  | Total | Total | 9 | 41 |
| Jenkins | DE | 0003 | 2 | 5 |
|  | Total | 0003 | 2 | 5 |
| Total |  |  | 17 | 46 |

FIG. 6C

| #CUSTOMER | #MATERIAL1 | #COUNTRY | QUANTITY1 | PRICE |
|---|---|---|---|---|
| Miller | 00001 | US | 5 | 500 |
| Miller | 00001 | DE | 1 | 100 |
| Henry | 00002 | US | 3 | 150 |
| Henry | 00001 | DE | 6 | 600 |
| Jenkins | 00003 | DE | 2 | 100 |

Sales Table

700

| #MATERIAL2 | #STOREHOUSE | QUANTITY2 |
|---|---|---|
| 00001 | 01 | 11 |
| 00002 | 01 | 18 |
| 00002 | 02 | 12 |
| 00003 | 01 | 5 |

Store table

FIG. 7

| #CUSTOMER1 | #MATERIAL1 | #COUNTRY | #STOREHOUSE | QUANTITY1 | QUANTITY2 | PRICE |
|---|---|---|---|---|---|---|
| Miller | 00001 | US | 01 | 5 | 11 | 500 |
| Miller | 00001 | DE | 01 | 1 | 11 | 100 |
| Henry | 00002 | US | 01 | 3 | 18 | 150 |
| Henry | 00002 | US | 02 | 3 | 12 | 150 |
| Henry | 00001 | DE | 01 | 6 | 11 | 600 |
| Jenkins | 00003 | DE | 01 | 2 | 5 | 100 |

FIG. 8A

| #MATERIAL1 | #COUNTRY | QUANTITY1 | QUANTITY2 |
|---|---|---|---|
| 00001 | US | 5 | 11 |
| 00001 | DE | 1 | 11 |
| 00002 | US | 6 | 30 |
| 00001 | DE | 6 | 11 |
| 00003 | DE | 2 | 5 |

FIG. 8B

EXTENDED HANDLING OF AMBIGUOUS JOINS

BACKGROUND

This disclosure relates generally to information analytics, and more particularly to generating information necessary for handling ambiguous joins within any information provider.

In relational databases, a join operation matches records in two tables. The two tables must be joined by at least one common field, i.e., the join field is a member of both tables. A join operation is usually part of a query. A typical OLAP-Query, for example, contains subtotal lines for many dimensions, and an overall total. Therefore, the measures contained in the query have to be aggregated on different levels. Previous methods include techniques to locally aggregate the data before the join, considering the requested aggregation level by building a partial query and then returning the data. However, it is not possible to build higher level subtotals by aggregating the measures over all dimensions contained in the result set. Also previous methods are not able to correctly handle all cases of table layouts with more than one join.

What is need is a method that allows to aggregate measures contained in data layouts involving ambiguous joins without reading the data several times on different aggregation levels, so data caches can be used.

SUMMARY

In general, this document discusses a system and method for handling of ambiguous joins among a number of tables from one or more infoproviders. A system and method are disclosed that execute an algorithm that generates and builds metadata for any structure consisting of table-like data connected together with inner or left-outer joins consisting of equal conditions.

In one implementation, a computer-implemented method for handling ambiguous joins among a plurality of tables based on a query includes the steps of generating metadata associated with the plurality tables. The metadata comprises ambiguous join dimensions and special measures, where the ambiguous join dimensions provide a list of all dimensions used in conditions of the query that are ambiguous, and the special measures provide a list of measures that are affected by the ambiguous join dimensions. The method further includes the step of aggregating data in the plurality of tables according to an aggregation level expressed in the query and based on the metadata.

In another implementation, a system for handling ambiguous joins among a plurality of tables based on a query includes a metadata generator that generates metadata associated with the plurality of tables, the metadata comprising ambiguous join dimensions and special measures. The system further includes an aggregator that aggregates data in the plurality of tables according to an aggregation level expressed in the query and based on the metadata.

In yet another implementation, an article is provided that includes tangibly embodied computer-readable media operable to cause data processing apparatus to perform operations including generating metadata associated with the plurality tables, the metadata comprising ambiguous join dimensions and special measures, the ambiguous join dimensions providing a list of all dimensions used in conditions of the query that are ambiguous, the special measures providing a list of measures that are affected by the ambiguous join dimensions. The article is further configured to cause data processing apparatus to perform a step of aggregating data in the plurality of tables according to an aggregation level expressed in the query and based on the metadata.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 1 illustrates a table layout for a system and method of handling ambiguous joins.

FIG. 4 is a result set of the example infoprovider shown in FIGS. 2A-C.

FIGS. 5A and B show join dimensions and join measures for the result set shown in FIG. 4.

FIGS. 6A-C illustrate an exemplary aggregation process.

FIG. 7 illustrates another example infoprovider table.

FIGS. 8A and 8B illustrate a regular result set and an aggregated result set, respectively.

Like reference symbols in the various drawings indicate like elements.

DETAILED DESCRIPTION

An infoprovider, or information provider, is any kind of data store that exposes its data in a flat table-like structure consisting of dimensions and measures. This disclosure describes a system and method providing information needed for an analytics engine to handle ambiguous joins within any infoprovider, without the need of the analytics engine to know the infoprovider's internal structure or internal data layout. This information hereafter is called "metadata," yet the infoprovider still appears to the analytics engine as a "flat" data store.

This metadata allows the analytics engine to cope with any infoprovider containing ambiguous joins in its internal structure without the need to know how exactly the infoprovider is built. The metadata includes the following components:

1. A list of all dimensions involved in an ambiguous join, that is, a list of all dimensions that are used in join conditions in joins that are ambiguous. These dimensions are hereafter referred to as "ambiguous join dimensions."

2. A list of all measures which are affected by ambiguous joins in a way that, without any special treatment, their values get multiplied due to ambiguous joins. This list also contains, for each of the measures, a list of related dimensions that the measures must not be aggregated over in order to prevent the multiplication of aggregated values. Only those dimensions that are already contained in the ambiguous join dimensions, are not in the same table as the measure, and are not ambiguous join dimensions joined to the measure are part of this list. These measures are hereafter referred to as "special measures."

Figure 2:
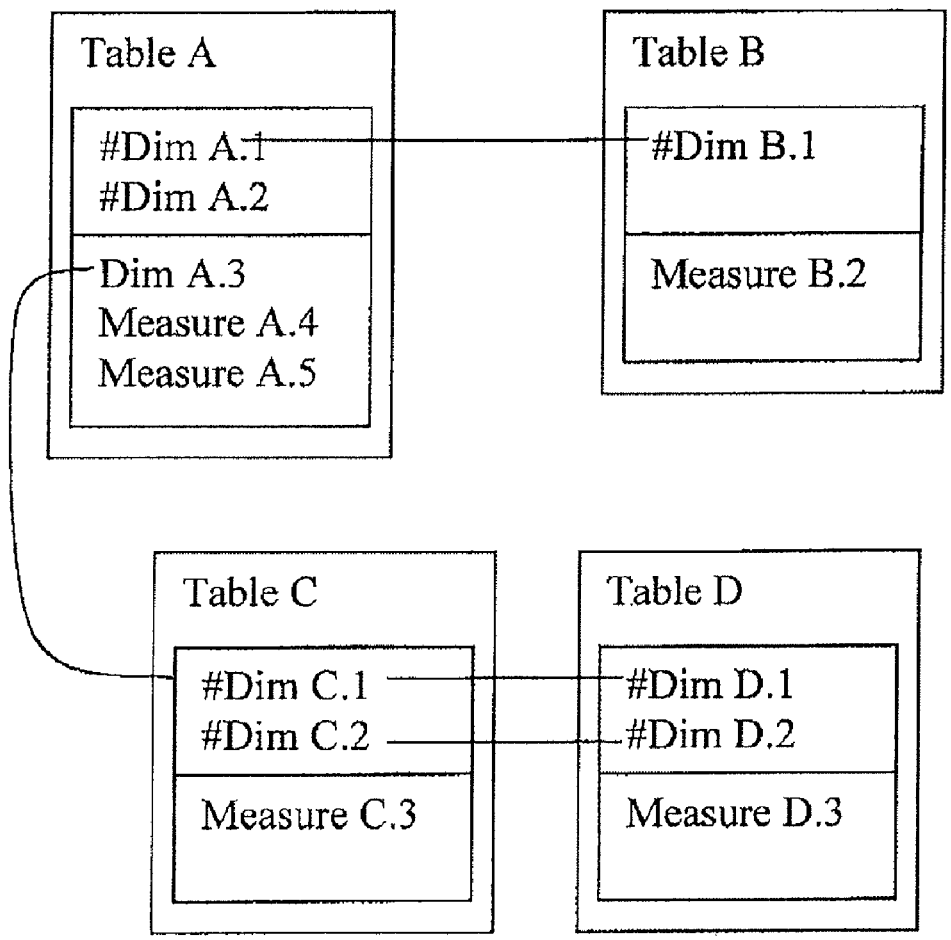
FIG. 2 illustrate an example infoprovider table having dimensions and measures.

3. Information about whether the infoprovider is able to handle ambiguous joins by building partial queries and aggregating the data to the requested aggregation level. FIG. 2 shows an example table layout according to the metadata generation scheme of the system and method disclosed herein.

Taking FIG. 1 as an example of the above-described metadata, the infoprovider will be able to expose the following dimensions and measures:

Dimensions: Customer, material1, country, material2, storehouse

Measures: quantity1, price and quantity2

In addition to the dimensions and measures, the exposed metadata contains the following:

Ambiguous join dimensions: material1, material2

Special measures: quantity2 with related dimensions customer, country

In accordance with the example of FIG. 1, the dimension material1 can be removed from the list of special measures for quantity2, as it is part of an ambiguous join dimension that is directly joined to the table that contains quantity2, since all joins in the schema are inner- or left-outer joins with equal conditions.

In this exemplary case, the following holds true: for inner joins, the number of rows in the result set does not change if, instead of one side of the join (material2) both sides of the join (material1 and material2) are contained in the result set, because the values of material1 and material2 are identical, so the omission of material1 from the result set does not generate an additional ambiguity.

For left outer joins, if the "outered" table is the Store table, in the result set there might exist "material" from the Sales table that does not exist in the Store table. In this case, the quantity2 measure in the result set also does not exist, so the omission of material1 from the result set does not generate any additional ambiguity. This is shown in FIG. 1B.

If the "outered" table is the Sales table, in the result set there might appear "material" values from the Store table that do not exist in the Sales table, in which case there are no filled special dimensions from the Sales table, as customer in that case also does not exist, so the omission of material1 from the result set does not generate any additional ambiguity. This is shown in FIG. 1C.

Figure 3:
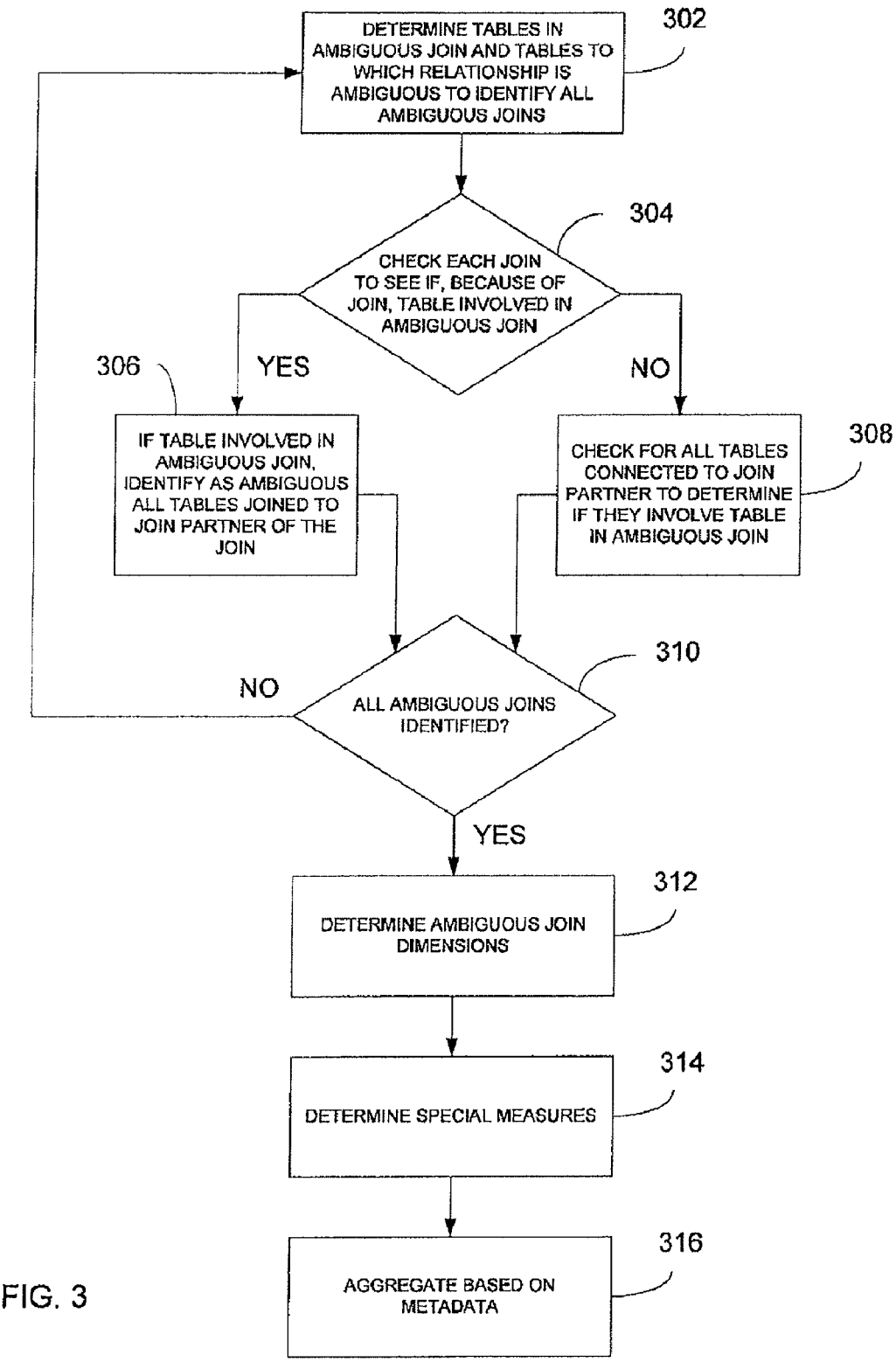
FIG. 3 is a flowchart of a method for handling ambiguous joins.

As illustrated in FIG. 3, a method 300 for handling ambiguous joins includes, at 302, determining tables involved in an ambiguous join and tables to which a relationship is ambiguous. For each table, at 304 it is determined whether the table is involved in an ambiguous join, or whether the table has to another table a relationship that is ambiguous.

To determine ambiguous joins, at 306 each join is checked whether, because of the join, a given table is involved in an ambiguous join. A table is involved in an ambiguous join if all key fields of the join partner are not part of the join condition. If due to a join, a table is involved in an ambiguous join, the table is also ambiguously related to all tables joined to the join partner of the join. The step at 306 continues for each join. If the direct join does not generate any ambiguity, at 308 all tables connected to the join partner are checked for whether they involve the table in an ambiguous join. The step 308 continues for each table connected to the join partner. FIG. 4 shows this interim result for the example set forth in FIG. 2.

At 310 it is determined whether all ambiguous joins have been identified. If not, the method 300 continues at 302 until all ambiguous joins have been identified. Once all ambiguous joins are so identified, at 312 ambiguous join dimensions are determined. The ambiguous join dimensions are all dimensions used in join conditions from joins identified from steps 302-308, causing the table to be involved into an ambiguous join because of its direct join partner. In accordance with the example presented in FIG. 2, FIG. 5A illustrates the joins that are directly responsible for possible ambiguities.

At 314, special measures are determined. The special measures are all measures related to the examined tables found in method 300 that are directly or indirectly involved in an ambiguous join. Associated dimensions are all dimensions contained in the tables directly or indirectly causing the ambiguity except those contained in the ambiguous join dimensions. In the table shown in FIG. 5B, dimensions included in ambiguous joins directly involving the examined table (i.e. in which the examined measures are contained) are strikedthrough.

In addition to the dimensions that are requested to answer a query, the following is requested of the infoproviders:

1. The ambiguous join dimensions specified in the metadata. In relation to the example above, to answer the query "How many items that have been sold to which country are on stock", the material is also needed in order to build the total line, otherwise the quantities for US and DE would be summed up and the result would be wrong. See FIG. 6A. This can be reached by "invisibly" adding the material. Then materials are not counted several times when calculating the Total line, as shown in FIG. 6B.

2. When aggregating measures, the OLAP processor must not aggregate the special measures over their related dimensions. Instead, just one value from the detail level is taken. For instance, in the example quantity2 must not be aggregated over country. A more complex query also involves the customer, as shown in FIG. 6C. The subtotals of quantity2 for each customer may not be normally aggregated over country, but they may be aggregated over material. Also the overall totals for quantity2 may no be aggregated over customer and country, but over material. Instead the measure quantity1 is just a normal measure and can be aggregated without any problem. The same data can be aggregated by the aggregator on several aggregation levels within the same query result.

3. If the infoprovider is able to handle ambiguous joins, related dimensions that do not appear in the query and are not contained in the ambiguous join dimensions do not need to be read from the infoprovider. In this case, the infoprovider delivers the data on the correct detail level. Otherwise, all related dimensions need to be read from the infoprovider in order to get correct results.

FIG. 7 illustrates another example. Given the table 700, the infoprovider has the following metadata:

Ambiguous join dimensions: material1, material2

Special measures: quantity1 with related dimension storehouse quantity2 with related dimensions country and customer If the infoprovider is not able to handle ambiguous joins, it would return the unaggregated result set shown in FIG. 8A for a query asking for country and quantity1, quantity2 (which is extended by the join dimension material). However, FIG. 5B shows an aggregated result set containing country, material, quantity1 and quantity2.

Figure 9:
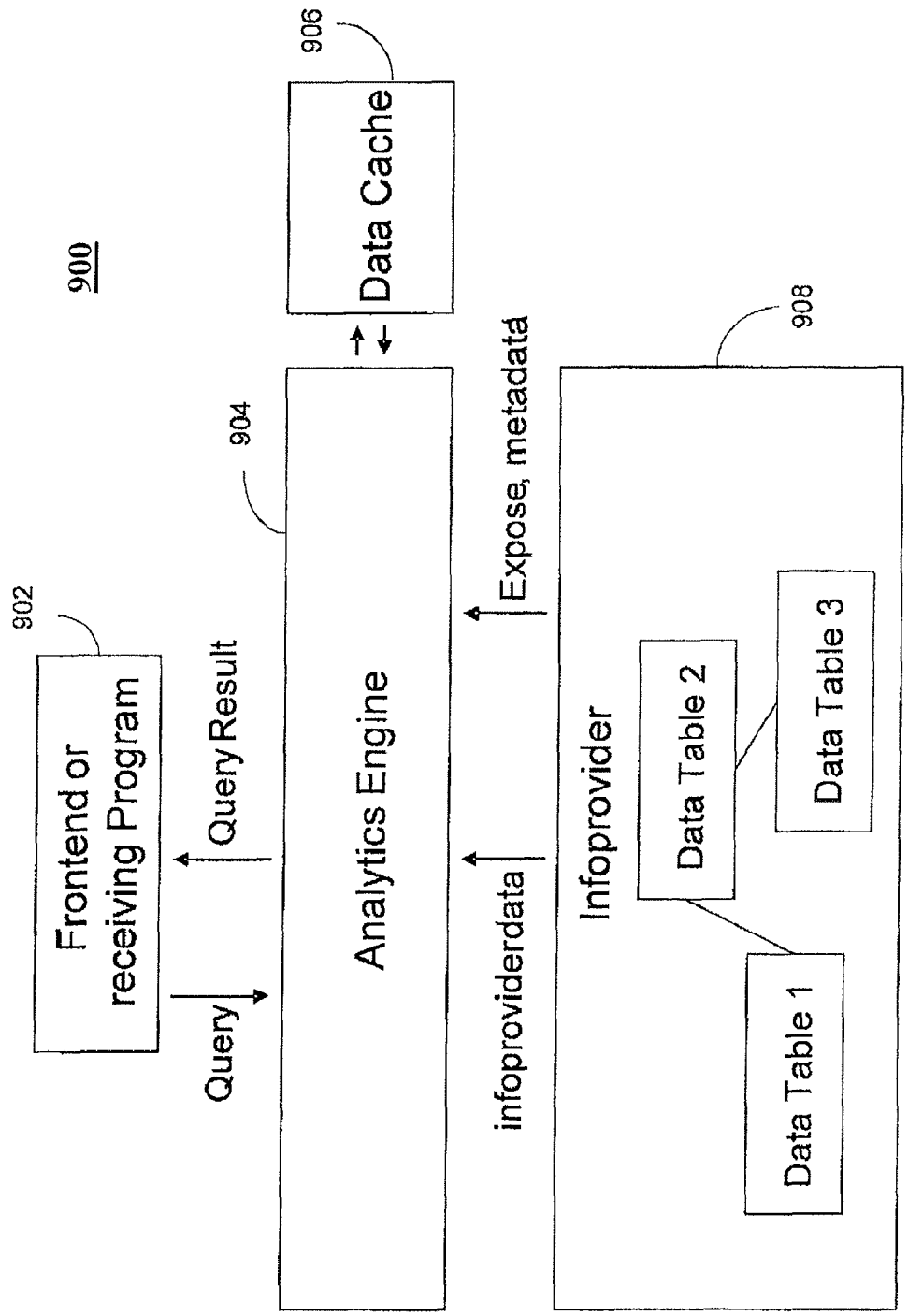
FIG. 9 shows a system for handling ambiguous joins.

FIG. 9 shows a system 900 for handling ambiguous joins. The system 900 includes a frontend 902, or receiving program, that passes a query over to an analytics engine 904 in one or more aggregation steps. An infoprovider 908 exposes its metadata to the analytics engine 904 in response to the aggregation. The metadata is computed according to the description above.

Based on the query and the metadata, the analytics engine 904 decides which dimensions and measures to query from the infoprovider 908, and whether and on which level the data can be aggregated. The infoprovider 908 delivers the data to the analytics engine 904, which computes the final result set according to processes described above. Infoprovider data can be put into a data cache 906, so that the same data does not need to be queried several times by the analytics engine 904 if queries need similar dimensions and measures.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-implemented method for handling ambiguous joins among a plurality of tables based on a query, the method comprising:
   generating metadata associated with the plurality of tables, the metadata comprising an ambiguous join dimensions list listing all dimensions used in join conditions of the query that are ambiguous, and a special measures list listing all measures in the plurality of tables that are affected by the ambiguous joins and one or more related dimensions for each of the measures that the each measure must not be aggregated over; and
   aggregating data in the plurality of tables according to an aggregation level expressed in the query and based on the metadata;
   exposing the metadata from one or more information providers associated with the plurality of tables;
   wherein the metadata further comprises information about whether each of the one or more information providers is capable of handling ambiguous joins by building partial queries and aggregating data from the partial queries to a requested aggregation level.

2. A method in accordance with claim 1, wherein aggregating data in the plurality of tables includes aggregating the exposed metadata based on the query.

3. A method in accordance with claim 1, further comprising determining, for each join requested by the query, whether a table of the plurality of tables is associated with an ambiguous join.

4. A method in accordance with claim 3, further comprising identifying all ambiguous joins for each table of the plurality of tables.

5. A method in accordance with claim 4, further comprising, for all identified ambiguous joins, generating the ambiguous join dimensions list.

6. A method in accordance with claim 5, further comprising, based on all tables involved in an ambiguous join, generating the special measures list according to the query.

7. A method in accordance with claim 1, wherein the special measures list includes only those related dimensions that are already contained in the ambiguous join dimensions list, are not in a same table of the plurality of tables as the each measure, and are not ambiguous join dimensions joined to the each measure.

8. A system for handling ambiguous joins among a plurality of tables based on a query, the system comprising:
   a metadata generator, implemented by one or more processors, that generates metadata associated with the plurality of tables, the metadata comprising an ambiguous join dimensions list listing all dimensions used in join conditions of the query that are ambiguous, and a special measures list listing all measures in the plurality of tables that are affected by the ambiguous joins and one or more related dimensions for each of the measures that the each measure must not be aggregated over; and
   an aggregator, implemented by the one or more processors, that aggregates data in the plurality of tables according to an aggregation level expressed in the query and based on the metadata; and
   means for exposing the metadata from one or more information providers associated with the plurality of tables;
   wherein the metadata further comprises information about whether each of the one or more information providers is capable of handling ambiguous joins by building partial queries and aggregating data from the partial queries to a requested aggregation level.

9. A system in accordance with claim 8, wherein the aggregator is further configured to aggregate the exposed metadata based on the query.

10. A system in accordance with claim 8, further comprising means for determining, for each join requested by the query, whether a table of the plurality of tables is associated with an ambiguous join.

11. A system in accordance with claim 10, further comprising means for identifying all ambiguous joins for each table of the plurality of tables.

12. A system in accordance with claim 11, further comprising means for generating the ambiguous join dimensions for all identified ambiguous joins.

13. A system in accordance with claim 12, further comprising means for generating the special measures according to the query based on all tables involved in an ambiguous join.

14. A system in accordance with claim 8, wherein the special measures list includes only those related dimensions that are already contained in the ambiguous join dimensions list, are not in a same table of the plurality of tables as the each measure, and are not ambiguous join dimensions joined to the each measure.

15. An article comprising non-transitory computer-readable media operable to cause data processing apparatus to perform operations comprising:
   generating metadata associated with the plurality of tables, the metadata comprising an ambiguous join dimensions list listing all dimensions used in join conditions of the query that are ambiguous, and a special measures list listing all measures in the plurality of tables that are affected by the ambiguous joins and one or more related dimensions for each of the measures that the each measure must not be aggregated over;
   aggregating data in the plurality of tables according to an aggregation level expressed in the query and based on the metadata; and
   exposing the metadata from one or more information providers associated with the plurality of tables;
   wherein the metadata further comprises information about whether each of the one or more information providers is capable of handling ambiguous joins by building partial queries and aggregating data from the partial queries to a requested aggregation level.

16. An article in accordance with claim 15, wherein aggregating data in the plurality of tables includes aggregating the exposed metadata based on the query.

17. An article in accordance with claim 15, further operable to cause data processing apparatus to perform operations comprising determining, for each join requested by the query, whether a table of the plurality of tables is associated with an ambiguous join.

18. An article in accordance with claim 17, further operable to cause data processing apparatus to perform operations comprising identifying all ambiguous joins for each table of the plurality of tables.

19. An article in accordance with claim 18, further operable to cause data processing apparatus to perform operations comprising, for all identified ambiguous joins, generating the ambiguous join dimensions list.

20. An article in accordance with claim 15, wherein the special measures list includes only those related dimensions that are already contained in the ambiguous join dimensions list, are not in a same table of the plurality of tables as the each measure, and are not ambiguous join dimensions joined to the each measure.

* * * * *